United States Patent [19]
Stursberg

[11] Patent Number: 5,018,911
[45] Date of Patent: May 28, 1991

[54] DRILLING APPARATUS FOR STRUCTURAL STEEL SHAPES

[75] Inventor: Bernd Stursberg, Ennepetal, Fed. Rep. of Germany

[73] Assignee: Carl Ullrich Peddinghaus, Wuppertal-Barmen, Fed. Rep. of Germany

[21] Appl. No.: 375,769

[22] Filed: Jul. 5, 1989

[30] Foreign Application Priority Data

Jul. 8, 1988 [DE] Fed. Rep. of Germany ....... 3823122

[51] Int. Cl.$^5$ .............................................. B23B 47/22
[52] U.S. Cl. ...................................... 408/13; 408/130; 408/88
[58] Field of Search ................ 408/13, 10'12, 408/8, 130, 62, 14, 7, 15; 82/133; 51/165, 85; 92/117 A, 113–115, 107, 108, 65, 63, 75; 91/410

[56] References Cited

U.S. PATENT DOCUMENTS

| | | | |
|---|---|---|---|
| 2,733,691 | 2/1956 | Johnson | 408/130 X |
| 3,326,067 | 6/1967 | Nelson | 408/12 |
| 4,175,413 | 11/1979 | van Geffen | 408/130 X |
| 4,412,465 | 11/1983 | Wright | 408/13 X |
| 4,664,566 | 5/1987 | Peddinghaus | 408/13 |
| 4,676,700 | 6/1987 | Peddinghaus | 408/88 X |

FOREIGN PATENT DOCUMENTS 761158 9/1980 U.S.S.R. .............. 408/130

*Primary Examiner*—Larry I. Schwartz
*Assistant Examiner*—R. S. Schultz
*Attorney, Agent, or Firm*—Herbert Dubno

[57] ABSTRACT

A drilling device for drilling holes in structural steel shapes utilizes a control system having a pair of control pistons to set the drill bit at an optimum distance from the workpiece for repeated drilling of holes through material of a given thickness. The control device responds to position switches sensing the positions of the drill-feed cylinder and the control pistons.

7 Claims, 3 Drawing Sheets

DRILLING APPARATUS FOR STRUCTURAL STEEL SHAPES

FIELD OF THE INVENTION

My present invention relates to a drilling apparatus for the drilling of holes in structural steel shapes, i.e. angles, plates, I-beams, T-beams, H-beams and the like. More particularly, the invention relates to a boring apparatus for this purpose which is capable of adjusting the retracted position of the drill bit preparatory to a subsequent drilling operation.

BACKGROUND OF THE INVENTION

A variety of drilling apparatuses are known for the formation of holes in structural steel shapes, e.g. the webs of the above mentioned beams, and can comprise a drilling or boring head disposed on a support which can be provided with a roll conveyor or like transporter for the structural steel shape or workpiece. Various degrees of mobility are provided for the head to enable the drill bit to be positioned at a proper location for drilling.

Reference may be had to the following U.S. Patents directed to drilling or related apparatuses for structural steel shapes and the like:

U.S. Pat. No. 4,676,000 issued 30 June 1987; U.S. Pat. No. 4,691,601 issued 8 Sept. 1987 and U.S. Pat. No. 4,632,365 issued 30 Dec. 1986. Reference may also be had to the following U.S. Applications directed to drilling apparatuses and the like: Ser. No. 07/303,603 filed 17 Jan. 1989; Ser. No. 07/316,754 filed 28 Feb. 1989; Ser. No. 07/316,756 filed 28 Feb. 1989; Ser. No. 07/316,757 filed 28 Feb. 1989; and Ser. No. 07/274,056 filed 29 Sept. 1988.

It is known, in connection with such apparatuses to mount the tool carrier, namely the drill bit holder and a motor for rotating the carrier and the drill bit, on the drilling head with aid of a drilling-feed piston and cylinder arrangement which can be controlled by fluid means and to utilize as control elements a proximity or position switch to output a control signal.

The control device can permit the drilling apparatus to be integrated in a line for the automatic processing of structural steel shapes. The control device can effect an advance or feed of the tool carrier with the tool and an extraction movement of the latter generally to a rest position which corresponds to the original starting position of the tool or carrier.

However, as far as I am aware, there has been no simple system provided heretofore which would permit automatic retraction of the drill bit to a position different from its starting position or located between its position of engagement with the workpiece and the original starting position, into a rest position preparatory for the drilling of the next hole. Stated more precisely, I am not aware of any simple arrangement which will allow retraction of the drill bit so that its tip or point is located at a predetermined distance from the surface of the workpiece preparatory for the next drilling operation and independent of the fully retracted or original starting position of the drill bit.

This positioning of the tool is important because it permits more rapid onset of the next drilling operation by eliminating the need to displace the drill bit excessively in both the retraction and the tool advance strokes.

OBJECTS OF THE INVENTION

It is, therefore, the principal object of the present invention to provide an improved drilling apparatus and control system therefore which permits in a simple and easy manner the positioning of the drill bit tip or point at a predetermined distance from the workpiece surface independently of the original or starting position of the drill bit.

Another object of my invention is to provide a drilling apparatus which will be free from drawbacks of earlier systems.

SUMMARY OF THE INVENTION

These objects and others which will become apparent hereinafter are attained, in accordance with this invention in a drilling apparatus for the drilling of steel structure shape workpieces which essentially comprises:

a support for the workpiece;
a drill head on the support, the drill head comprising:
  a drill-bit carrier receiving a drill bit and rotatable to drill the workpiece,
  a drill-feed cylinder displaceable on the support in a drilling direction parallel to the drill bit, and
  a drill-feed piston received in the drill-feed cylinder and operatively connected to the carrier, the drill-feed piston defining in the drill-feed cylinder a first pressurizable compartment effective to displace the drill-feed piston toward the workpiece and a second pressurizable compartment effective to retract the drill-feed piston from the workpiece; and
control means on the drill head for establishing a predetermined retracted position of the drill bit from the workpiece, the control means including:
  a first control cylinder,
  a first control piston in the first control cylinder defining therein a first control chamber hydraulically coupled with the first pressurizable compartment, and a second control chamber hydraulically effective on the first control piston in a direction opposite an effective direction of the first control chamber, the first control piston defining therein a second control cylinder,
  a second control piston in the second control cylinder and defining therein a third control chamber hydraulically connected to the first control chamber and a fourth control chamber hydraulically connected to the second control chamber and effective on the second control piston opposite pressure in the third control chamber, the control pistons having displacements corresponding to an advance of the drill bit plus a length of a tip thereof, the second piston having a fluid displacement corresponding to fluid displacement of the drill-feed piston for a retraction of the drill bit to the predetermined position of the tip from the workpiece,
  a first control valve selectively connecting the second and fourth control chamber with a hydraulic pressure source and the second compartment with a hydraulic drain in one position of the first control valve and connecting the second and fourth control chamber with the hydraulic drain and the second compartment with the hydraulic pressure source in another position of the first control valve, a second control valve selectively connecting the first and third chambers and the first compartment with the pressure source and the drain, and respective sensors responsive to positions of the second piston and the drill-feed cylinders for controlling the control valves.

According to a feature of the invention, the second control piston is juxtaposed with a proximity switch to signal its position while the drill-feed cylinder is provided with a ca operating a further switch which likewise then constitutes a position-sensing or proximity switch.

The latter cylinder can, moreover, be acted upon by a spring biasing the cylinder toward the workpiece.

Utilizing this apparatus, I am able to accurately position the tip of the drill bit at a predetermined distance from the workpiece surface and to eliminate the need to retract the drill bit to its original starting position in which the drill bit might be quite remote from the workpiece surface, since as soon as the tool drills through the workpiece, the pressure in the first compartment is relieved and the spring acts to draw the drill-feed cylinder downwardly, activating the cam switch to raise the drill-feed piston only to a height limited by the drill-feed cylinder.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
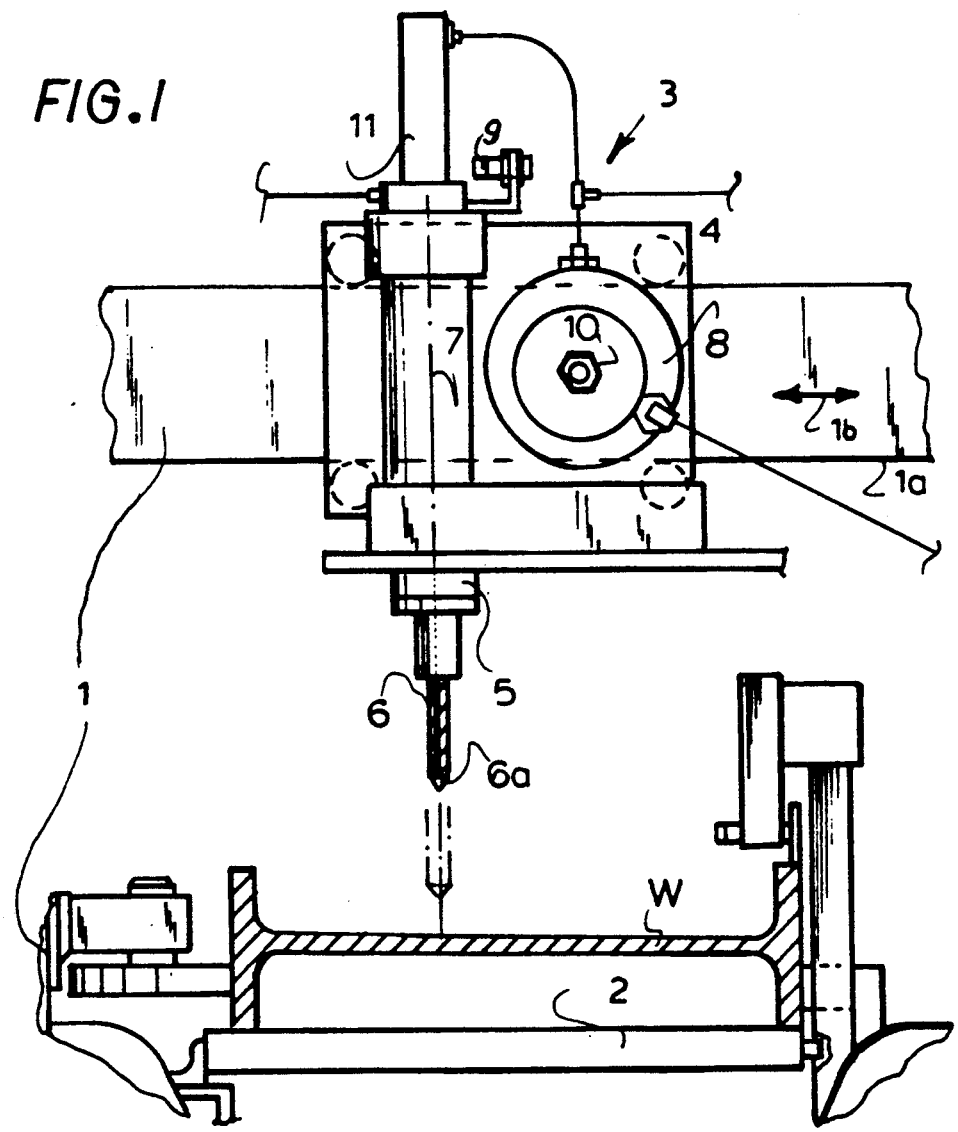
FIG. 1 is a vertical section taken perpendicular to the direction of displacement of the workpiece and parallel to the drill bit through an apparatus in accordance with the present invention.

The drilling apparatus shown in FIG. 1 basically comprises a support 1 upon which a structural steel shape workpiece W can be displaced, e.g. on a roller conveyor 2. The support 1 also comprises a rail 1a on which a drill head 3 is displaceable in the direction of the arrow 1b to position a drill bit 6 at an exact location of the workpiece W to be drilled. The principles involved there, of course, are those discussed in the aforementioned U.S. Patents.

The head 3 comprises the carriage 4 displaceable on the rail 1a and a tool carrier 5 mounted on the carriage so as to be vertically displaceable along the axis of the drill bit 6 by a piston and cylinder arrangement 7 referred to herein as the drill-feed cylinder and the drill-feed piston, respectively. An electric motor or the like (not shown) may set the drill bit 6 in motion. The drill bit has a tip 6a which initially penetrates the workpiece and, when the apparatus is operative, will be positioned at a predetermined distance from the workpiece preparatory for the next drilling operation. A control device 8 is provided for the apparatus and utilizes signal-generating proximity or position indicating switches 9 and 10. As will be apparent from the drawing, the drill-feed cylinder 11 is shiftable toward and away from the workpiece, i.e. in the direction of the arrow 11' (of FIG. 2a) relative to the carriage 4 and along the axis of the carrier 5. The drill-feed piston 12 is slidable in the cylinder and is operatively connected to the drill bit 6. Hydraulic fluid can be fed to a compartment 11b to advance the drill bit and apply a downward force on the cylinder 11 and to a compartment 11b to apply an upward force on the cylinder 11.

The drill head 3 is provided with the control device 8 having a first control cylinder 13 and a first control piston 14. The latter is internally provided with a second control cylinder 15a and a second control piston 15 which can slide in the first control piston 14 together with or opposite thereto.

The linear displacement path for the first control piston 14 in the first control cylinder 13 can correspond to the displacement of the drill bit 6 plus the axial length of its tip 6a. The volume displacement of the second control piston 15 in its full stroke is dimensioned to establish a retraction movement of the drill bit 6 to a predetermined distance at which the tip of the drill bit is spaced above the workpiece 4 to be drilled. This will be apparent from FIGS. 2A-2D.

Turning to these FIGURES, it can be seen that the control device 8 comprises a first control valve 16 which can be of the 4-port, 2-position type and which connects the cylinder compartment 11a below the feed piston 12 and the second control chamber 13a on one side of the first control piston 14, in addition to a second control valve 17, selectively to a hydraulic pressure source P or the tank or drain T of this pressure source.

The second cylinder chamber 13b on one side of the second control piston 15 located within the first control piston 14, is continuously connected with the cylinder chamber 13a through the first control piston 14 by a throttle passage 14'.

The arrangement is such that the second control valve 17, which can be a 2-port, 2-position valve, enables the cylinder 13c on the other side of the first control piston 14, which also communicates with the chamber 15b and the compartment 11b, to be connected selectively to the pressure source P or the tank or drain T.

A proximity switch 10 is juxtaposed with the piston 15 and the switch 9 is operated by a cam on the cylinder 11.

One of these position sensing switches 9 and 10 of the control arrangement, namely the switch 9, is thus responsive to the position of the feed cylinder 11 while the other, namely, the switch 10 is responsive to the position of the second control piston 15.

Figure 2A:
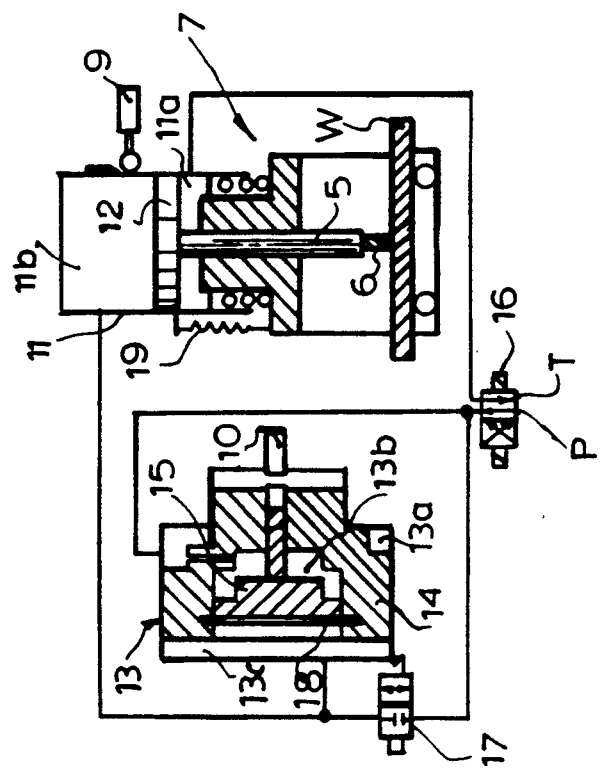
FIGS. 2A-2D are diagrams illustrating successive steps in the operation of the apparatus of FIG. 1.

The starting position of the apparatus has been shown in FIG. 2A. The control valves 16 and 17 are in their rest positions. Neither of the switches 9 and 10 is actuated. The feed cylinder 11 is in its starting position.

To set the apparatus in operation, a signal is inputted to the controller 30 to switch the control valve 16. A fast speed advance of the drill bit downwardly is thus effected until the final position represented in FIG. 2B is reached.

The hydraulic medium flows directly into the cylinder chambers 13a and 13b and through the control valve 17 into a first control chamber 13c and the compartment 11b.

Figure 2B:
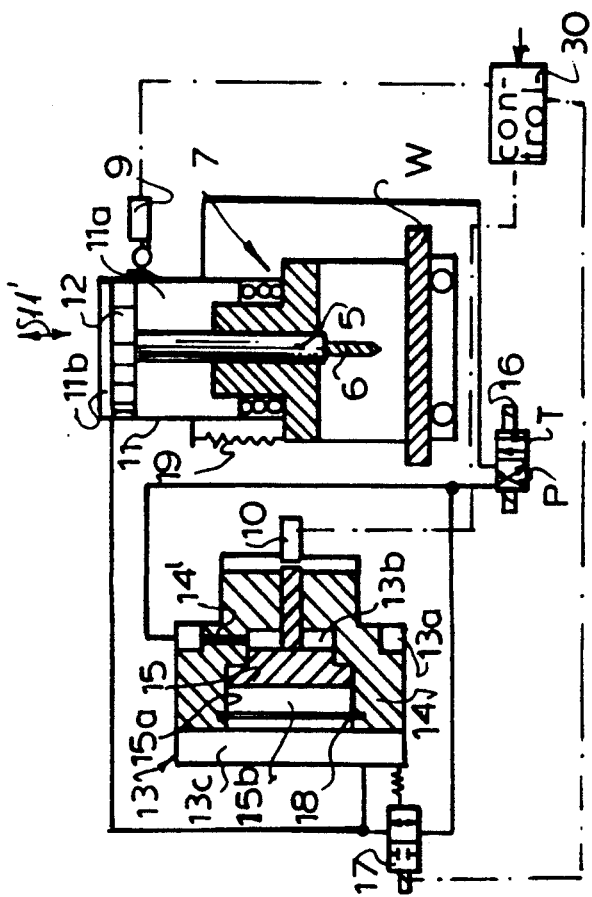

Because a pressure drop of around 5 bar is provided by a throttling effect in the control valve 17, the control piston 15 is shifted to the left against an abutment 18, while the lower pressure in chamber 13c acts to arrest shifting of the piston 14, thereby bringing the system to the positions illustrated in FIG. 2B.

The control piston 14 remains arrested in its position. In the feed cylinder 11, the piston 12 is driven toward the workpiece W and the drill bit 6 can engage the latter.

The hydraulic medium further fed to the compartment 11b displaces the feed cylinder 11 against the force of the tension spring 19 downwardly. The switch 9 is thereby actuated and through the control 30, shifts the valve 17 into a blocking position. As can be seen from FIG. 2c, when the valve 17 is in its blocking position, hydraulic medium flows into the compartment 11b. Because of the pressure on the stepped annular surface of piston 14, and 15, the piston 14 is moved to the left in the drawing along with the piston 15 and displaces the hydraulic medium from the cylinder chamber 13c into the cylinder compartment 11b in a transformation mode utilizing the pistons 14, 15 as the pressurizer. Piston 15 during this movement remains in its left-hand position against the abutment 18. Because of the pressure transformation, the pressure in chamber 13c is less than in the chambers 13a and 13b, enabling the leftward movement of both pistons 14 and 15 so that the drill bit 6 is driven through the workpiece W until the tool drills through the workpiece and the pressure in compartment 11b is relieved.

Figure 2D:
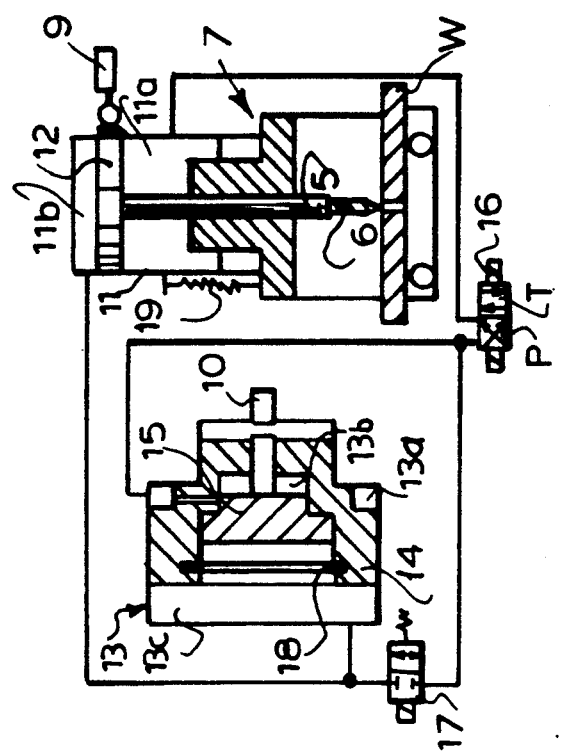
Figure 2C:
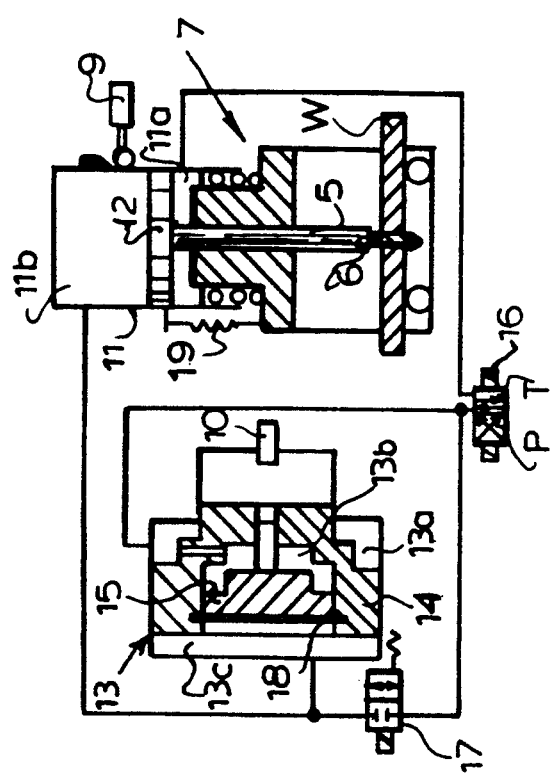

The conclusion of the drilling operation is shown in FIG. 2D. After the drill 6 has been fully displaced through the workpiece W there is no longer a force resisting downward movement of the drill bit and the pressure in compartment 11b is thereby relieved The spring 19 draws the feed cylinder 11 back to its starting position and the switch 9, responsive to the shifting of the cylinder 11, is again actuated and switches the valve 16 into its new position, in which Hydraulic fluid fed to the cylinder compartment 11a drives the piston 12 upwardly and withdraws the drill bit 6 from the workpiece W and the fluid in cylinder 11b is then displaced and forced into the cylinder chamber 13c and moves the piston 14 back to its starting position.

The additional volume flow from compartment 11b also moves the piston 15 to the right into its starting position and the drill bit 6 is halted in a position just above the workpiece W. When the control piston 14 and 15 have reached their terminal positions (note that it is the same whether the control piston 14 reaches its end position before the control piston 15 or vice versa), the proximity switch 10 transmits a signal that the final position has been reached so that the workpiece W can be advanced for the next drilling operation.

Since, for the same workpiece, the next drilling operation encounters the same material thickness, it is commenced simply by reversing the position of the valve 16.

For the drilling of a new workpiece W with another material thickness, the control valve 17 is switched into its rest position and the drill 6 is retracted to its original starting position as shown in FIG. 2A. For effective functioning of the apparatus it is important that the volumetric displacement of the control piston 14 correspond to the volume of the fluid needed to displace the drill bit 6 plus its tip 6a through the workpiece W, i.e. by a distance equal to the material thickness plus the length of the drill tip, and that the piston stroke or the volumetric displacement of the piston 15 corresponds to the distance of the tip from the workpiece W, i.e. the retraction displacement of the drill after leaving the workpiece or the feed distance until the bit engages the workpiece, about 25 mm.

The volumetric displacement of the control piston 14 is thus dependent upon the thickness of the material drilled. The piston stroke of the control piston 15 within piston 14 can always be the same.

For drilling a multiplicity of holes in a workpiece of the same thickness, the drill bit 6 need not be returned to its starting position but can be held at an optimum distance from the workpiece, as shown in FIG. 2D, preparatory for the next drilling operation. This insures considerable time saving and it will be understood that the invention is also applicable to the positioning of a multiplicity of drills which simultaneously are to drill holes in the workpiece.

I claim:

1. An apparatus for drilling holes in a steel structural-shape workpiece, comprising:
    a support for said workpiece;
    a drill head on said support, said drill head comprising:
    a drill-bit carrier receiving a drill bit and rotatable to drill said workpiece,
    a drill-feed cylinder displaceable on said support in a drilling direction parallel to said drill bit,
    oppositely acting resilient means for biasing said drill-feed cylinder along said drilling direction toward a predetermined rest position, and
    a drill-feed piston received in said drill-feed cylinder and operatively connected to said carrier, said drill-feed piston defining in said drill-feed cylinder a first pressurizable compartment effective to displace said drill-feed piston toward said workpiece and a second pressurizable compartment effective to retract said drill-feed piston from said workpiece; and
    control means on said drill head for establishing a predetermined retracted position of said drill bit from said workpiece, said control means including:
    a first control cylinder,
        a first control piston in said first control cylinder defining therein a first control chamber hydraulically coupled with said first pressurizable compartment, and a second control chamber hydraulically effective on said first control piston in a direction opposite an effective direction of said first control chamber, said first control piston defining therein a second control cylinder,
        a second control piston in said second control cylinder and defining therein a third control chamber hydraulically connected to said first control chamber and a fourth control chamber hydraulically connected to said second control chamber and effective on said second control piston opposite pressure in said third control chamber, said control pistons having displacements corresponding to an advance of said drill bit plus a length of a tip thereof, said second control piston having a fluid displacement corresponding to fluid displacement of said drill-feed piston for a retraction of said drill bit to said predetermined position of said tip from said workpiece,
        a first control valve selectively connecting said second and fourth control chambers with a hydraulic pressure source and said second compartment with a hydraulic drain in one position of said first control valve and connecting said second and fourth control chamber with said hydraulic drain and said second compartment with said hydraulic pressure source in another position of said first control valve, a second control valve selectively connecting said first and third chambers and said first compartment with said pressure source in one position of said second control valve and said drain in another position of said second control valve, and respective sensor means responsive to positions of said second piston and said drill-feed cylinder for controlling said control valves.

2. The apparatus defined in claim 1, further comprising a stop in said first control cylinder engaging said second control piston upon pressurization of said fourth control chamber.

3. The apparatus defined in claim 2 wherein said sensor means responsive to said second control piston is a proximity switch.

4. The apparatus defined in claim 2 wherein said sensor means responsive to the position of said drill-feed cylinder is a cam on said drill-feed cylinder and a cam-operated switch engageable by said cam.

5. The apparatus defined in claim 2, wherein said resilient means comprises spring connected to said drill-feed cylinder and urging same toward said workpiece.

6. The apparatus defined in claim 5 wherein said sensor means responsive to said second control piston is a proximity switch.

7. The apparatus defined in claim 6 wherein said sensor means responsive to the position of said drill-feed cylinder is a cam on said drill-feed cylinder and a cam-operated switch engageable by said cam.

* * * * *